United States Patent
Roberts

(10) Patent No.: US 7,263,333 B2
(45) Date of Patent: Aug. 28, 2007

(54) WIRELESS ULTRA WIDEBAND NETWORK HAVING FREQUENCY BIN TRANSMISSION LEVEL SETTING AND RELATED METHODS

(75) Inventor: Richard D. Roberts, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 414 days.

(21) Appl. No.: 10/963,392

(22) Filed: Oct. 12, 2004

(65) Prior Publication Data

US 2005/0164642 A1 Jul. 28, 2005

Related U.S. Application Data

(60) Provisional application No. 60/539,683, filed on Jan. 28, 2004, provisional application No. 60/539,684, filed on Jan. 28, 2004.

(51) Int. Cl.
*H04B 17/00* (2006.01)

(52) U.S. Cl. ............ 455/67.13; 455/522; 455/423

(58) Field of Classification Search ............ 455/67.13, 455/522, 423; 375/267, 299, 284, 285
See application file for complete search history.

(56) References Cited

U.S. PATENT DOCUMENTS

| | | | |
|---|---|---|---|
| 5,400,322 A | 3/1995 | Hunt et al. ............... 370/19 |
| 6,072,420 A | 6/2000 | Hellsten ................... 342/25 |
| 6,384,773 B1 | 5/2002 | Martin et al. ............ 342/202 |
| 6,529,568 B1 | 3/2003 | Richards et al. ......... 375/346 |
| 6,560,463 B1 | 5/2003 | Santhoff .................. 455/522 |
| 6,668,008 B1 | 12/2003 | Panasik .................... 375/139 |
| 2003/0007576 A1* | 1/2003 | Alavi et al. .............. 375/329 |
| 2004/0008617 A1 | 1/2004 | Anand et al. |
| 2004/0092281 A1* | 5/2004 | Burchfiel ................. 455/522 |
| 2005/0078763 A1* | 4/2005 | Choi et al. ............... 375/267 |
| 2005/0094740 A1* | 5/2005 | Borran et al. ............ 375/267 |
| 2005/0232336 A1* | 10/2005 | Balakrishnan et al. ..... 375/130 |

OTHER PUBLICATIONS

Kolic, Ultra Wideband—The Next Generation Wireless Connection, Apr. 2003, Intel Corporation, available at www.deviceforge.com.

Batra et al., IEEE P802.15 Wireless Personal Area Networks, Multi-band OFDM Physical Layer Proposal for IEEE 802.15 Task Group 3a, Texas Instruments et al., Nov. 10, 2003.

Porcino; "Coexistence of UWB Technology with FWA Services", 33rd European Microwave Conference, Oct. 7-9, 2003, Piscataway, New Jersey, USA; vol. 2, pp. 857-860, XP010681030.

* cited by examiner

*Primary Examiner*—Sanh D. Phu
(74) *Attorney, Agent, or Firm*—Allen, Dyer, Doppelt, Milbrath & Gilchrist, P.A.

(57) ABSTRACT

A wireless ultra wideband (UWB) network may include a plurality of UWB wireless devices communicating over a plurality of UWB frequency bins extending over a UWB frequency range. At least one of the UWB wireless devices may be for determining an existing interference level associated with at least one of the UWB frequency bins, and for setting a desired transmission level for use with the at least one UWB frequency bin. In particular, the desired transmission level may be set based upon the existing interference level to keep a predicted overall interference level of the at least one UWB frequency bin below an interference ceiling.

31 Claims, 6 Drawing Sheets

WIRELESS ULTRA WIDEBAND NETWORK HAVING FREQUENCY BIN TRANSMISSION LEVEL SETTING AND RELATED METHODS

CROSS-REFERENCE TO RELATED APPLICATIONS

This application claims the benefit of U.S. Provisional Application Nos. 60/539,684, and 60/539,683, both filed Jan. 28, 2004, which are hereby incorporated herein in their entireties by reference.

FIELD OF THE INVENTION

The present invention relates to the field of wireless communications systems, and, more particularly, to wireless ultra wideband (UWB) communications systems and related methods.

BACKGROUND OF THE INVENTION

Ultra wideband (UWB) is currently expected to become the preferred format for wireless communications in certain short range applications, such as personal area networks (PANs), for example. By way of example, a PAN may include a number of household electronic devices such as video recorders, personal computers, high-definition televisions (HDTVs), etc., which communicate video, audio, and other data therebetween. UWB technology is particularly attractive for PANs not only because it allows large amounts of digital data to be transmitted over a short distance at very low power, but it also has the ability to carry signals through obstacles (doors, etc.) that otherwise tend to reflect signals at narrower bandwidths and higher power.

As a result of the significant interest in UWB communications, an Institute for Electrical and Electronic Engineering (IEEE) working group has been tasked with developing standards for UWB communications in wireless PANs. In particular, the IEEE802.15.3a working group is developing a high-speed UWB physical layer (PHY) enhancement to the general 802.15.3 WPAN standard for applications which involve imaging and multimedia.

One of the leading UWB waveforms in the IEEE802.15.3a selection process is frequency hopping orthogonal frequency division multiplexing (FH-OFDM). While much progress has been made in developing the framework for FH-OFDM, many areas remain to be fully developed. One such area is interference mitigation. In one proposal submitted Nov. 10, 2003 by Batra et al. entitled "Multi-band OFDM Physical Layer Proposal for IEEE 802.15 Task Group 3a," which is hereby incorporated herein in its entirety by reference, the use of a front-end pre-select filter in UWB receivers is proposed to reject out-of band noise and interference.

Other interference mitigation techniques have also been proposed for UWB communications. By way of example, U.S. Pat. No. 6,560,463 to Santhoff discloses a UWB communication system which includes a transceiver configured to receive a UWB communication signal, which has embedded power level data. A measurement circuit in the transceiver measures the strength of the received signal. An attenuation factor is computed that compares the measured signal strength to the data embedded in the signal. An adaptive circuit uses the attenuation factor to select a power level for a next transmission. The transceiver also has a positioning circuit that is used to accurately determine the distance from the transceiver to the source of the communication signal, and the adaptive circuit uses the distance to tune the power level for the next transmission. This patent states that the accurate selection of the lowest acceptable power level minimizes interference between communication cells, thereby increasing reliability and optimizing bandwidth utilization.

Despite the advancements in UWB communications, further improvements may be required, such as for implementing the IEEE 802.15 standards. This may be particularly true in the area of interference mitigation.

SUMMARY OF THE INVENTION

In view of the foregoing background, it is therefore an object of the present invention to provide a UWB wireless network providing enhanced transmission level setting features based upon existing interference levels and related methods.

This and other objects, features, and advantages in accordance with the present invention are provided by a ultra wideband (UWB) wireless network including a plurality of UWB wireless devices communicating over a plurality of UWB frequency bins extending over a UWB frequency range. At least one of the UWB wireless devices may be for determining an existing interference level associated with at least one of the UWB frequency bins, and setting a desired transmission level for use with the at least one UWB frequency bin. In particular, the desired transmission level may be set based upon the existing interference level to keep a predicted overall interference level of the at least one UWB frequency bin below an interference ceiling.

More specifically, the existing interference level may be an interference noise temperature level, and the interference ceiling may be an interference noise temperature ceiling. Thus, the transmission level for one or more frequency bins may advantageously be individually set to a maximum level that will still keep the overall interference noise temperature level under an interference noise temperature ceiling.

The UWB wireless device may determine the existing interference noise temperature level by determining a plurality of successive signal levels associated with the at least one UWB frequency bin, determining an interference noise floor based upon the successively determined signal levels, and determining the interference noise temperature level based upon the interference noise floor. Moreover, the UWB wireless device may determine the interference noise floor by generating a histogram based upon the successively determined signal levels, and determining the interference noise floor based upon the histogram.

In addition, the UWB wireless device may have a gain level and a noise level associated therewith. As such, the UWB wireless device may determine the existing interference noise temperature level based upon the interference noise floor and the gain and noise levels associated with the UWB wireless device. The UWB wireless device may include a fast Fourier transform (FFT) module and/or a discrete Fourier transform (DFT) for determining the successive signal levels, for example.

The UWB wireless device may also communicate the desired transmission level to another UWB wireless device for use in communications therewith. It may further determine the existing interference level when it is not communicating with another UWB wireless device. By way of example, the UWB frequency bins may be orthogonal frequency division multiplexing (OFDM) frequency bins, and the at least one UWB wireless device may perform frequency hopping.

A UWB wireless communications method aspect of the invention may include using a plurality of UWB wireless devices to communicate over a plurality of UWB frequency bins extending over a UWB frequency range. The method may further include determining an existing interference level associated with at least one of the UWB frequency bins, and setting a desired transmission level for use with the at least one UWB frequency bin based upon the existing interference level to keep a predicted overall interference level of the at least one UWB frequency bin below an interference ceiling.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Figure 1:
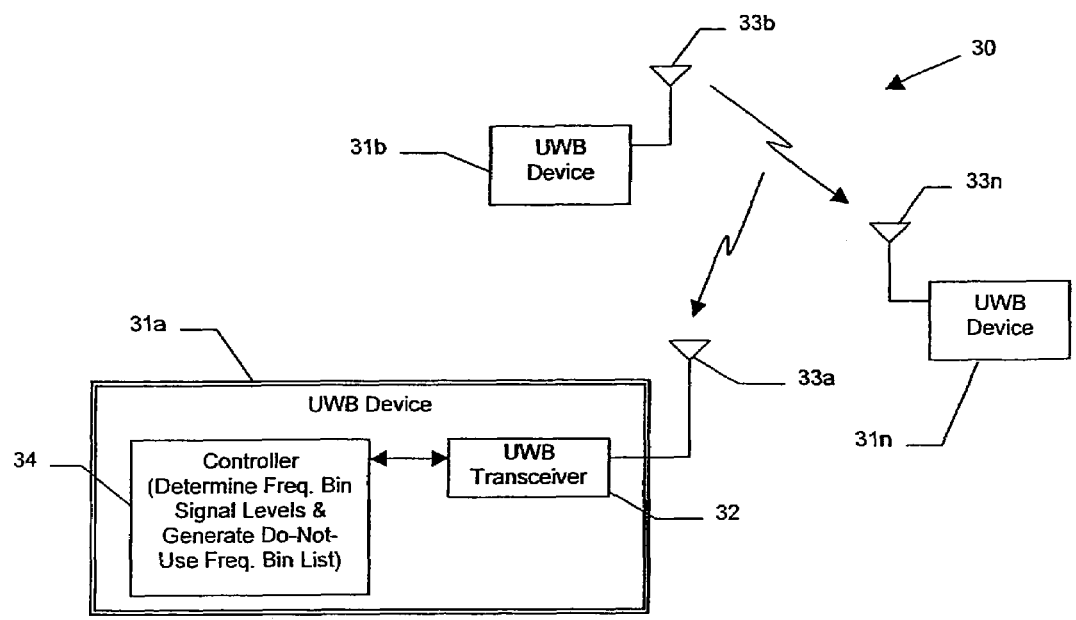
FIG. 1 is schematic block diagram of a UWB wireless network in accordance with the present invention.
Figure 2:
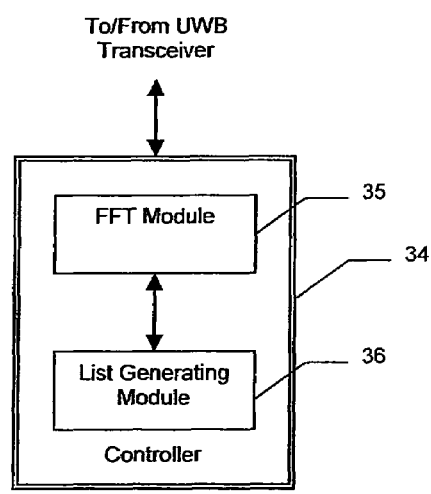
FIG. 2 is a more detailed schematic block diagram of the UWB device controller as shown in FIG. 1.

Referring initially to FIG. 1, a ultra wideband (UWB) wireless network 30 in accordance with the present invention illustratively includes a plurality of UWB wireless devices 31a-31n communicating over a plurality of UWB frequency bins extending over a UWB frequency range. By way of background, the frequency range approved for UWB communications by the FCC in the U.S. extends from 3.1 GHz to 10.59925 GHz. The proposed IEEE 802.15.3 multi-band UWB approach involves sub-dividing this 7.5 GHz spectrum width into several 528 MHz sub-bands. The sub-bands are grouped into five logical channels, some of which will be mandatory for all UWB devices, while others will be optional. Furthermore, for the proposed FH-OFDM structure, each sub-band is further sub-divided into 128 4.125 MHz OFDM frequency bins, giving a total of 1818 bins which are numbered 0 through 1817.

During normal operation, the devices 31a-31n illustratively include respective antennas 33a-33n, and these devices establish UWB communications links between one another and communicate via these links in accordance with the appropriate UWB standards, such as those outlined in the 802.15.3 and 3a proposals, for example. These devices then communicate accordingly over some grouping (e.g., a channel) of the above-noted UWB frequency bins, as will be appreciated by those skilled in the art.

More particularly, the UWB device 31a illustratively includes a UWB transceiver 32 and associated antenna 33a, and a controller 34 coupled to the UWB transceiver. It should be noted that the other UWB devices 31 may include similar components, which are not shown for clarity of illustration. In an FH-OFDM device, the controller 34 will preferably include a fast Fourier transform (FFT) module 35 that can be used to perform a spectral scan across the frequency bins of the sub-band(s) of interest in a manner similar to a spectrum analyzer. A discrete Fourier transform (DFT) module may also be used, as will be appreciated by those skilled in the art.

In accordance with the present invention, the FFT module 35 is advantageously used to determine a respective actual signal level associated with each UWB frequency bin of interest (i.e., in the UWB channel(s) or sub-bands being used). The controller 26 also illustratively includes a list generating module 36, which generates a do-not-use UWB frequency bin list by comparing each actual signal level with at least one interference threshold. By way of example, the FFT module 35 and the list generating module 36 may be implemented as software modules to be executed by a processor, as will be appreciated by those skilled in the art.

In the case where the controller 34 and transceiver 32 operate using FH-OFDM, the frequency of narrowband interference can advantageously be identified to within the FFT accuracy of one OFDM bin. Thus, the UWB wireless devices 31a-31n (or at least some of these devices) can avoid using those frequency bins experiencing excessive interference to thereby provide more reliable UWB communications.

Figure 3:
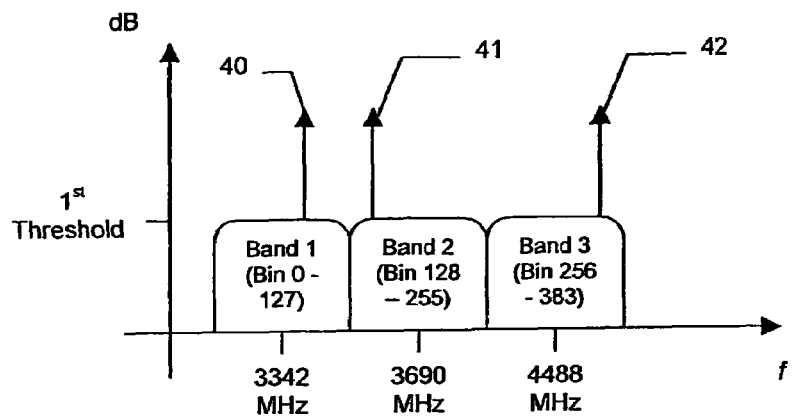
FIG. 3 is a graph of a UWB channel with sub-bands and frequency bins therein illustrating signal levels exceeding a first threshold when the bins are not in use in accordance with the present invention.
Figure 4:
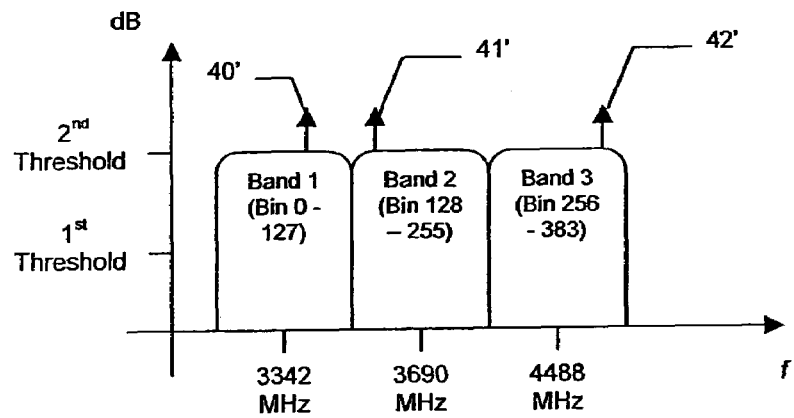
FIG. 4 is a graph of the UWB channel of FIG. 3 and frequency bins therein illustrating signal levels exceeding a second threshold when the bins are in use in accordance with the present invention.

The determination of the actual signal levels will be further understood with reference to FIGS. 3 and 4, each of which illustrates a UWB channel including three sub-bands. At each frequency hop, the FFT module 35 determines which frequency bins are experiencing interference energy by comparing the actual, measured signal level for that bin with one of two interference thresholds. More particularly, when the frequency bin is not in use, then a first interference threshold is used, as seen in FIG. 3. In the illustrated example, the first sub-band, which is centered at 3,342 MHz, has a bin with a signal level above the first interference threshold, as represented by the arrow 40. The second and third sub-bands, which are centered at 3,690 and 4,488 MHZ, respectively, also have frequency bins with signal levels above the first threshold, as represented by the arrows 41, 42.

The first interference threshold is preferably an expected average energy value for when no transmissions are occurring over the given frequency bin. As seen in FIG. 4, a second threshold, which is higher than the first threshold, is used when the particular frequency bin in question is in use. The second threshold may similarly be an expected average energy value for when a frequency bin is in use. It should be noted that other interference thresholds beside average values may be used, as will be appreciated by those skilled in the art. For example, the first and second interference thresholds may simply be maximum allowable or desired thresholds.

Figure 5:
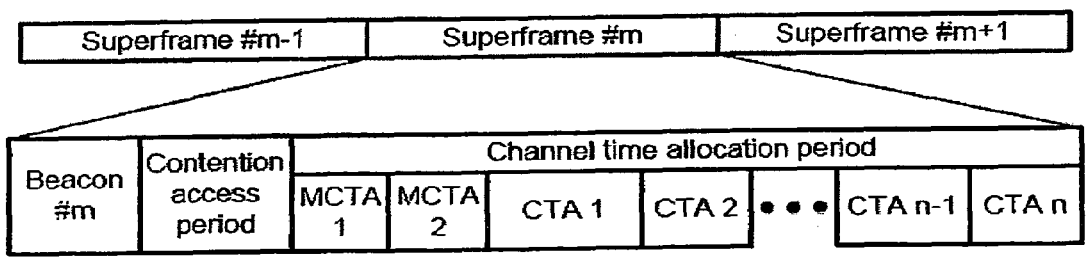
FIG. 5 is a diagram of a prior art UWB media access layer (MAC) superframe.

The monitoring/scanning of the UWB frequency range of interest may be accomplished by observing link activity within the UWB media access control (MAC) superframe. Referring more particularly to FIG. 5, the IEEE 802.15.3 MAC superframe is a representative packet link superframe. This superframe includes three main periods, namely a beacon period, a contention access period (CAP), and a channel time allocation period (CTAP). A piconet controller (PNC) transmits beacons at the beginning of every superframe during the beacon period, and new UWB wireless devices join a piconet during each CAP. The beacon period is used to set the timing allocations and to communicate management information for the piconet. The beacon consists of the beacon frame, as well as any announce commands sent by the PNC as a beacon extension.

The CAP is used to communicate commands and/or asynchronous data if it is present in the superframe. The CTAP is composed of channel time allocations (CTAs), including management CTAs (MCTAs). CTAs are used for commands, isochronous streams and asynchronous data connections. In FIG. 5, the MCTAs are shown first, but the PNC is allowed to place any number of them at any position in the superframe.

The length of the CAP is determined by the PNC and communicated to the devices in the piconet via the beacon. However, the PNC is able to replace the functionality provided in the CAP with MCTAs, except in the case of the 2.4 GHz PHY where the PNC is required to allow devices to use the CAP. MCTAs are a type of CTA that are used for communications between the devices and the PNC. The CAP uses CSMA/CA for the medium access. The CTAP, on the other hand, uses a standard TDMA protocol where the devices have specified time windows. MCTAs are either assigned to a specific source/destination pair and use TDMA for access, or they are shared CTAs that are accessed using the slotted aloha protocol, as will be appreciated by those skilled in the art.

The UWB device 31a preferably monitors a particular UWB frequency range for narrowband interference activity during those periods when it is not communicating with other devices (i.e., when the PNC is not in use), for example. Once the list generating module determines the frequency bins which have an actual signal level above the appropriate threshold, it logs an 11-bit binary value for each of the 1,818 frequency bins that is suffering interference. By way of example, suppose that interference activity is observed at 4.7 GHz, between 5.20 GHz to 5.22 GHz and at 7.3 GHz. If this interference maps to bins 388, 509, 510, 511, 512, 513, 514 and 1018, then the list generating module 36 would generate and store a do-not-use frequency bin list including each of these bin numbers.

The UWB wireless device 31a then communicates the table to one or more other devices in the network 30, which also stores the list. Then, when these devices communicate with one another, they will not use those frequencies included in the stored list (unless this feature is disabled, as will be discussed further below). Of course, the list may be updated at periodic or intermittent intervals, or when a measured quality-of-service (QoS) level indicates that a new list needs to be generated, for example, as will be appreciated by those skilled in the art. It should also be noted that other devices in the network 30 besides device 31a may also generate do-not-use frequency bin lists as described above in certain embodiments, if desired.

Figure 6:
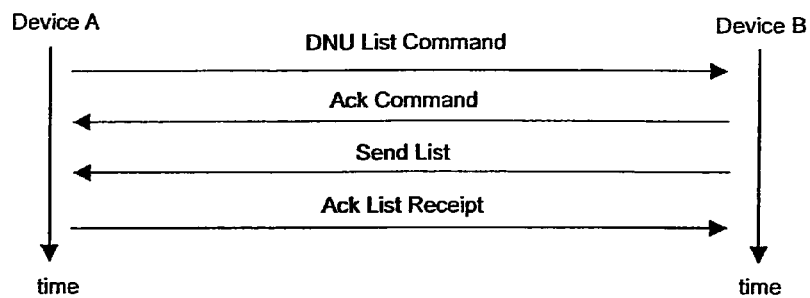
FIG. 6 is a signal flow diagram of the communication of a do-not-use frequency list between UWB devices in accordance with the present invention.

Referring more particularly to FIG. 6, to accommodate exchange of the do-not-use frequency bin list between different devices 31, an additional command (DNU List Command) may be introduced into the MAC command structure for requesting that the do-not-use list be sent. Once this command is received, the receiving device (device B in the illustrated example) returns an acknowledge (ACK) command back to device A. Device B then sends the do-not-use frequency bin list to device A, which returns an ACK list receipt to device B. This notifies device B that the table was correctly received based, for example, on a correct cyclic redundancy check (CRC) checksum, as will be appreciated by those skilled in the art.

One further MAC modification which may be implemented in certain embodiments is to allow use of the do-not-use frequency bin list to be suspended. One way to do this is to add a bit to each transmitted packet header to let the receiving device know whether the list is to be used (e.g., 0 indicates that the list is not to be used, 1 indicates that it is to be used, or vice-versa). An example of when it may not be desirable for the transmitting device to use the list is in a multi-cast environment where there is more than one receiver.

In certain applications, it may be desirable to use a template or default do-not-use frequency bin list as a starting point. For example, this might be done to tailor the UWB spectrum to meet a unique regional regulatory frequency requirements. This may be accomplished by loading the template into the PHY information management data base. The default template would be read prior to all transmissions and would be common to all devices within the piconet. Thus, the use of the do-not-use bit in the header noted above could be restricted to making command changes to the do-not-use frequency list during link time. This would allow the transmitting device to adaptively adjust the spectrum for dynamic interference environments, as will be appreciated by those of skill in the art.

Figure 10:
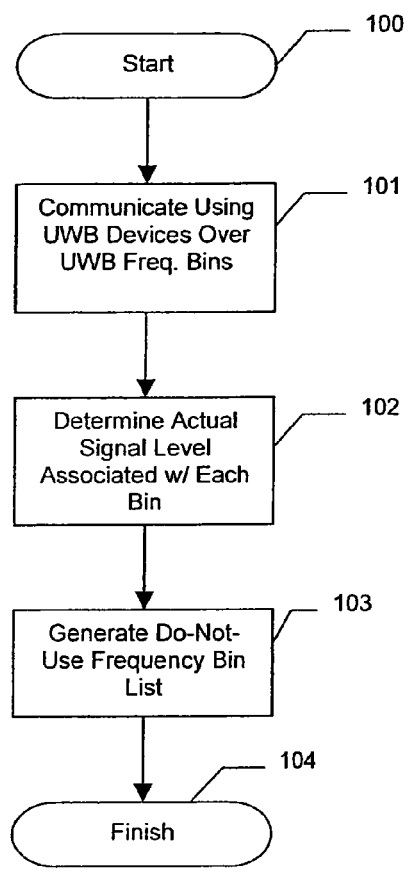
FIGS. 10 and 11 are flow diagrams for generating UWB frequency bin do-not-use lists in accordance with the present invention.

A wireless ultra wideband (UWB) communications method aspect of the invention will now be described with reference to FIG. 10. The method begins (Block 100) with using a plurality of UWB wireless devices 31 to communicate over a plurality of UWB frequency bins extending over a UWB frequency range, as discussed above, at Block 101. A respective actual signal level associated with each UWB frequency bin is then determined, at Block 102, and a do-not-use UWB frequency bin list is then generated by comparing each actual signal level with at least one interference threshold, at Block 103, as further discussed above, thus concluding the illustrated method (Block 104).

Figure 11:
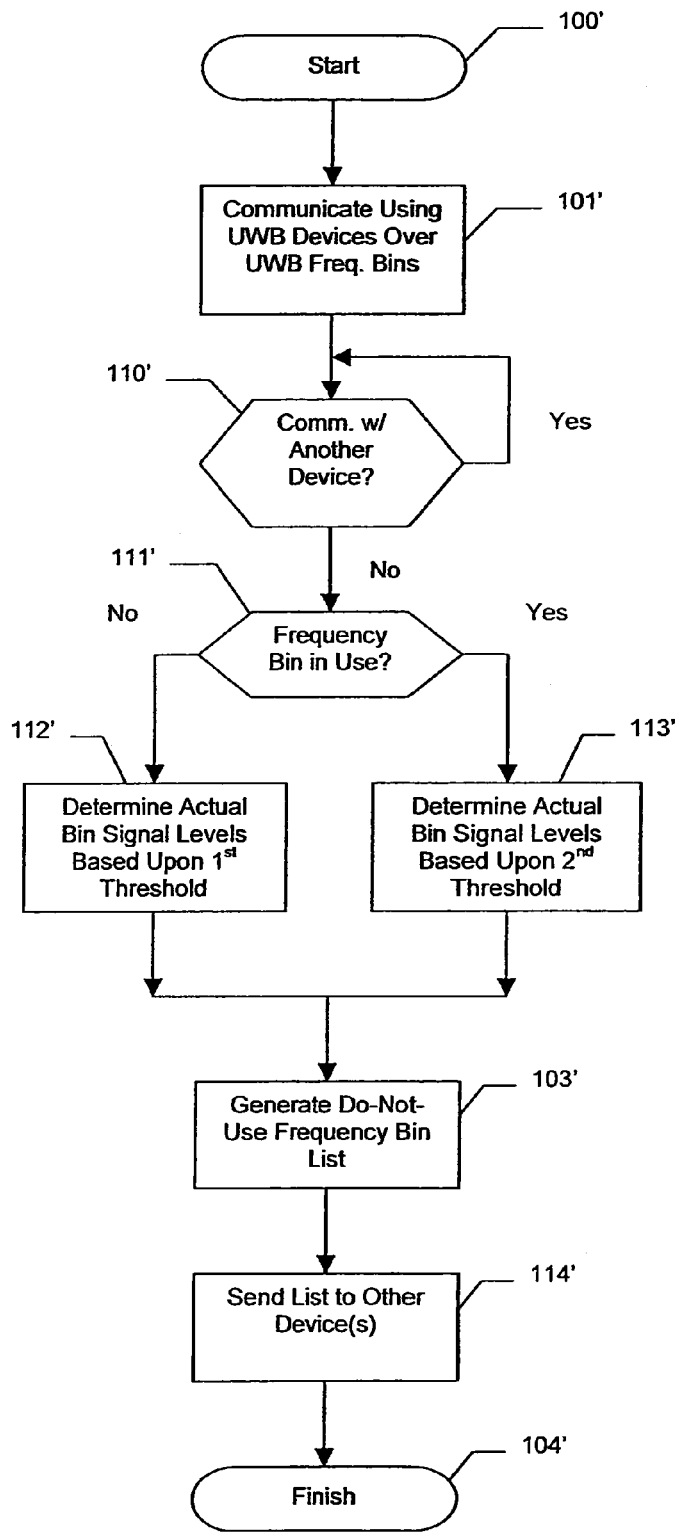

Further method aspects will now be described with reference to FIG. 11. Prior to determining the actual signal levels, the UWB wireless device 31a may first determine whether it is engaged in communications with another device, at Block 110'. If so, it will wait until the communications are completed to begin the actual signal level determination process. An initial determination is made as to whether the particular frequency bin is in use, at Block 111', which may be done on an individual basis, or at the sub-band or channel level, depending the particular implementation. If the frequency bin is not in use, the first threshold is used for comparison, at Block 112', otherwise the second (higher) threshold is used, at Block 113', as discussed above. Again, once generated the do-not-use frequency list is preferably communicated to one or more other devices for use in communications therewith.

Figure 7:
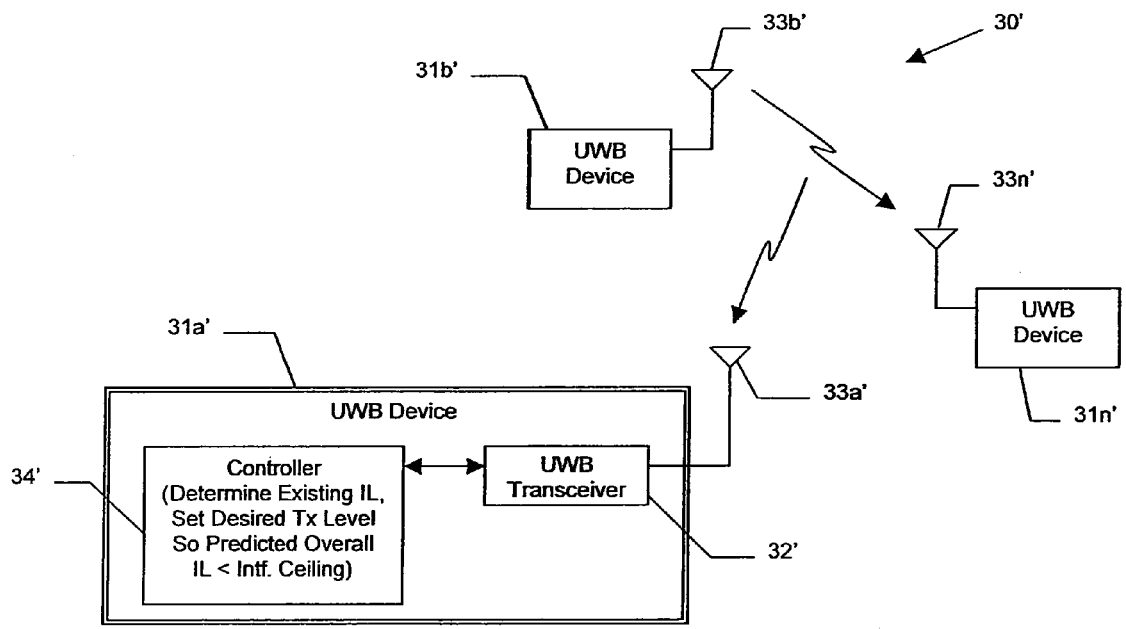
FIG. 7 is a schematic block diagram of another UWB wireless network in accordance with the present invention.
Figure 8:
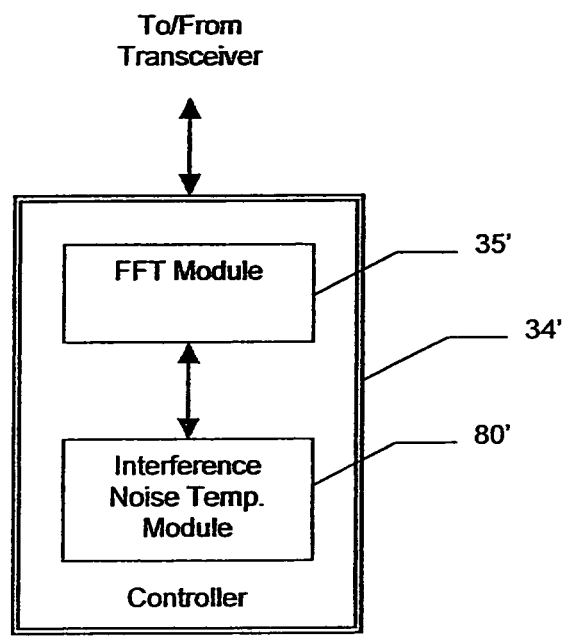
FIG. 8 is a more detailed schematic block diagram of the UWB device controller as shown in FIG. 7.

Another related aspect of the invention will now be described with reference to FIGS. 7 and 8. Generally speaking, in the illustrated UWB network 30' the UWB wireless device 31a' determines an existing interference level, such as interference noise temperature, associated with one or more of the UWB frequency bins. The device 31a' then sets a desired transmission level for use with the UWB frequency bin(s) based upon the existing interference level to keep a predicted overall interference level of the at least one UWB frequency bin below an interference ceiling. By way of example, the interference level may be an interference noise temperature ceiling mandated by a governing authority, such as the FCC. The device 31a' therefore advantageously determines the maximum amount of transmission power that may be used for a given bin(s), yet still remain within regulatory guidelines to maximize transmission capacity.

As noted above, an FH-OFDM device can perform a spectral analysis of the UWB channel during "dead time" when it is not actively participating in data transfer with another device. The spectral analysis is accomplished by monitoring and measuring the energy in each OFDM bin. In accordance with this aspect of the invention, enough measurements of the signal level in each bin are taken to extract the interference noise floor at each OFDM frequency bin. This can be done by taking multiple measurements and constructing a numerical histogram of energy in each frequency bin, which may be done by an interference noise temperature module 80'.

Figure 9:
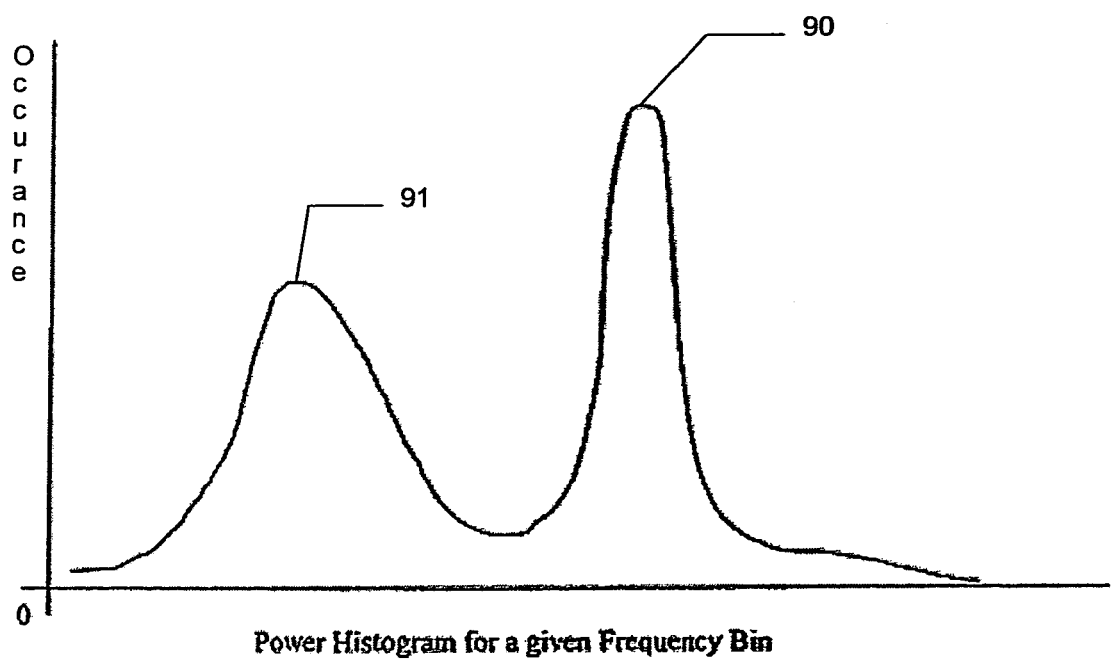
FIG. 9 is a histogram of the OFDM bin energy for use in determining an existing interference noise temperature in accordance with the present invention.

An exemplary histogram is shown in FIG. 9. At any given time, a frequency bin will either have UWB transmissions therein, or it will have only residual interference noise. The histogram may be used to separate these two cases. Preferably, a separate numeric histogram is generated for each frequency bin (although all bins need not be monitored in all applications), and thus 1,818 histograms will be created. Again, each histogram is generated based upon multiple spectral measurements.

In the illustrated histogram it may be seen that the signal energy is bifurcated into two segments, namely an upper segment 90 which represents an active UWB signal, and a lower segment 91 that represents some residual interference noise floor. In those cases where there is no UWB energy present during the generation of the histogram, only the lower segment would be present. The power in the lower segment 91 is used to determine the noise floor.

By knowing the variance of the lower segment 91 data, the receiver gain of the transceiver 32' at the time that the histogram was generated, the receiver noise figure of the transceiver, and by having an estimate of the antenna 33' gain characteristics, the interference noise level can be accurately estimated, as will be appreciated by those skilled in the art. Hence, the interference noise temperature that exists at a given particular frequency bin may also be estimated. Again, this information is preferably ascertained for each 4.125 MHz wide frequency bin across the UWB spectrum, although this need not be the case in all embodiments.

The interference noise temperature data generated as described above may be stored in a column of a table with 1,813 rows (i.e., one row for each frequency bin). Another column in the table may include the applicable FCC imposed interference noise temperature. The difference between these values is used to calculate a maximum allowable TX power, on a per frequency bin basis, that the transmitting device may emit and still operate within FCC limits. These calculated values may be included in yet another column associate with the table. This last column would be used by a transmitting UWB wireless device 31 to adjust the amplitude associated with each OFDM frequency bin on a per-bin basis. As will be appreciated by those skilled in the art, this may be done relatively easily with OFDM since the modulation starts in the frequency domain at the transmitter prior to the transmission inverse FFT (IFFT) that results in a time waveform for transmission.

Figure 12:
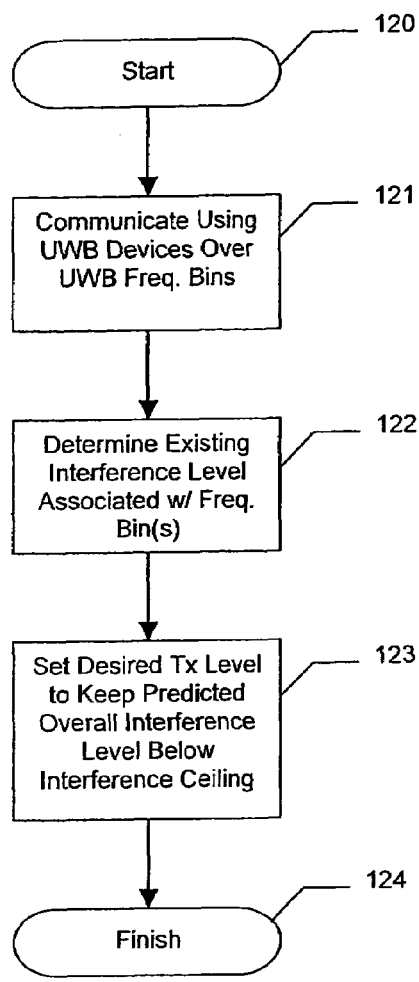
FIGS. 12 and 13 are flow diagrams illustrating methods for setting UWB frequency bin desired transmission levels to keep an interference level of the frequency bin below an interference ceiling in accordance with the present invention.

Another UWB wireless communications method aspect of the invention for setting the transmission power level as described above is now described with reference to FIG. 12. Beginning at Block 120, a plurality of UWB wireless devices 31a'-31n' communicate over a plurality of UWB frequency bins extending over a UWB frequency range, at Block 121, as discussed above. An existing interference level associated with at least one of the UWB frequency bins is determined, at Block 122. Further, a desired transmission level is set for use with the at least one UWB frequency bin based upon the existing interference level to keep a predicted overall interference level of the at least one UWB frequency bin below an interference ceiling, at Block 123, as further discussed above, thus concluding the illustrated method (Block 124).

Figure 13:
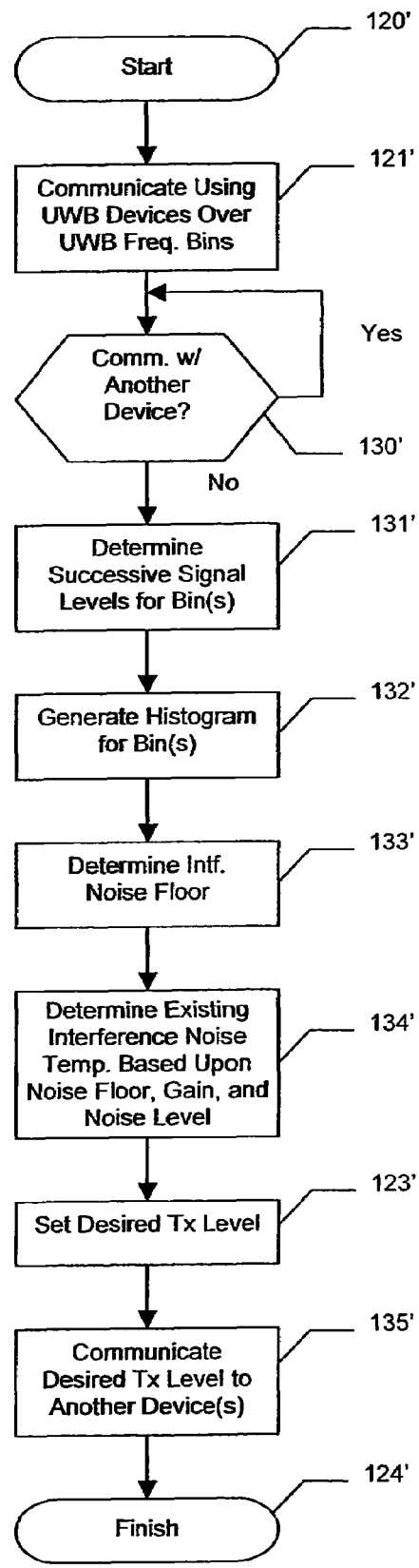

Additional method aspects will be further understood with reference to FIG. 13. In particular, prior to determining the interference noise temperature, it may first be determined whether the particular device is engaged in communications, at Block 130'. If so, the device waits until the communications have ceased, and then it begins the interference noise temperature determination. This includes determining a plurality of successive signal levels for one or more of the bins (Block 131'), generating a histogram for each frequency bin based upon the successively determined signal levels (Block 132'), and determining the interference noise floor based upon the histogram (Block 133'), as discussed above.

The existing interference noise temperature may then be determined using the interference noise floor, and the gain and noise level associated with the device 31a', at Block 134', and the desired transmission level may then be set accordingly for the bin(s), at Block 123', as described further above. The desired transmission levels, which may be embodied in a table as described above, may then be communicated to one or more other devices 31' for use in communications therebetween, at Block 135'.

By way of example, the various aspects of the present invention described above are particularly well suited for products or devices used in wireless PANs with relatively short range (e.g., less than 10 meters) and high bit rates (e.g., greater than 100 Mbps). Although the invention has generally been described in the context of the proposed IEEE802.15.3 and 3a standards for clarity of explanation, it may be used in other UWB communications applications as well, as will be appreciated by those skilled in the art.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An ultra wideband (UWB) wireless network comprising:
   a plurality of UWB wireless devices communicating over a plurality of UWB frequency bins extending over a UWB frequency range;
   at least one of said UWB wireless devices for
      determining an existing interference level associated with at least one of the UWB frequency bins comprising an existing interference noise temperature level by
         determining a plurality of successive signal levels associated with the at least one UWB frequency bin,
         determining an interference noise floor based upon the successively determined signal levels, and
         determining the interference noise temperature level based upon the interference noise floor, and
      setting a desired transmission level for use with the at least one UWB frequency bin based upon the existing interference level to keep a predicted overall interference level of the at least one UWB frequency bin below an interference ceiling, the interference ceiling comprising an interference noise temperature ceiling.

2. The UWB wireless network of claim 1 wherein said at least one UWB wireless device determines the interference noise floor by:
   generating a histogram based upon the successively determined signal levels; and
   determining the interference noise floor based upon the histogram.

3. The UWB wireless network of claim 1 wherein said at least one UWB wireless device has a gain level and a noise level associated therewith; and wherein said at least one UWB wireless device determines the existing interference noise temperature level based upon the interference noise floor and the gain and noise levels associated with said at least one UWB wireless device.

4. The UWB wireless network of claim 1 wherein said at least one UWB wireless device comprises a fast Fourier transform (FFT) module for determining the successive signal levels.

5. The UWB wireless network of claim 1 wherein said at least one UWB wireless device comprises a discrete Fourier transform (DFT) module for determining the actual signal levels.

6. The UWB wireless network of claim 1 wherein said at least one UWB wireless device communicates the desired transmission level to another UWB wireless device for use in communications therewith.

7. The UWB wireless network of claim 1 wherein said at least one UWB wireless device determines the existing interference level when it is not communicating with another UWB wireless device.

8. The UWB wireless network of claim 1 wherein the UWB frequency bins comprise orthogonal frequency division multiplexing (OFDM) frequency bins.

9. The OWE wireless network of claim 1 wherein said at least one OWE wireless device performs frequency hopping.

10. An ultra wideband (UWB) wireless network comprising:
    a plurality of UWB wireless devices communicating over a plurality of UWB orthogonal frequency division multiplexing (OFDM) bins extending over a OWE frequency range;
    at least one of said UWB wireless devices for
       determining an existing interference noise temperature level associated with at least one of the OFDM frequency bins by
          determining a plurality of successive signal levels associated with the at least one OFDM frequency bin,
          determining an interference noise floor based upon the successively determined signal levels, and
          determining the interference noise temperature level based u on the interference noise floor, and
       setting a desired transmission level for use with the at least one OFDM frequency bin based upon the existing interference noise temperature level to keep a predicted overall interference noise temperature level of the at least one OFDM frequency bin below an interference noise temperature ceiling.

11. The UWB wireless network of claim wherein determining the interference noise floor comprises:
    generating a histogram based upon the successively determined signal levels; and
    determining the interference noise floor based upon the histogram.

12. The UWB wireless network of claim 10 wherein said at least one UWB wireless device has a gain level and a noise level associated therewith; and wherein said at least one UWB wireless device determines the existing interference noise temperature level based upon the interference noise floor and the gain and noise levels associated with said at least one UWB wireless device.

13. The UWB wireless network of claim 10 wherein said at least one UWB wireless device comprises a fast Fourier transform (FFT) module for determining the successive signal levels.

14. The UWB wireless network of claim 10 wherein said at least one UWB wireless device comprises a discrete Fourier transform (DFT) module for determining the actual signal levels.

15. The UWB wireless network of claim 10 wherein said at least one UWB wireless device communicates the desired transmission level to another UWB wireless device for use in communications therewith.

16. The UWB wireless network of claim 10 wherein said at least one UWB wireless device determines the existing interference noise temperature level when it is not communicating with another UWB wireless device.

17. The UWB wireless network of claim 10 wherein said at least one UWB wireless device performs frequency hopping.

18. An ultra wideband (UWB) wireless device comprising:
    a UWB transceiver for communicating with at least one other UWB wireless device over a plurality of UWB frequency bins extending over a UWB frequency range;
    a controller coupled to said UWB transceiver for
       determining an existing interference level associated with at least one of the UWB frequency bins comprising an existing interference noise temperature level by
          determining a plurality of successive signal levels associated with the at least one frequency bin,
          determining an interference noise floor based upon the successively determined signal levels, and
          determining the interference noise temperature level based upon the interference noise floor, and setting a desired transmission level for use with the at least one UWB frequency bin based upon the existing interference level to keep a predicted overall interference level of the at least one UWB frequency bin below an interference ceiling comprising an interference noise temperature ceiling.

19. The UWB wireless device of claim 18 wherein said controller determines the interference noise floor by:
generating a histogram based upon the successively determined signal levels; and
determining the interference noise floor based upon the histogram.

20. The UWB wireless device of claim 18 wherein said UWB transceiver has a gain level and a noise level associated therewith; and wherein said controller determines the existing interference noise temperature level based upon the interference noise floor and the gain and noise levels associated with said UWB transceiver.

21. The UWB wireless device of claim 18 wherein said controller comprises a fast Fourier transform (FFT) module for determining the successive signal levels.

22. The UWB wireless device of claim 18 wherein said controller comprises a discrete Fourier transform (DFT) module for determining the actual signal levels.

23. The UWB wireless device of claim 18 wherein said controller cooperates with said UWB transceiver to communicate the desired transmission level to another UWB wireless device for use in communications therewith.

24. The UWB wireless device of claim 18 wherein said controller determines the existing interference level when said UWB transceiver is not communicating with another UWB wireless device.

25. The UWB wireless device of claim 18 wherein the frequency bins comprise orthogonal frequency division multiplexing (OFDM) frequency bins.

26. The UWB wireless device of claim 18 wherein said controller cooperates with said UWB transceiver to perform frequency hopping.

27. An ultra wideband (UWB) wireless communications method comprising:
using a plurality of UWB wireless devices to communicate over a plurality of UWB frequency bins extending over a UWB frequency range;
determining an existing interference level associated with at least one of the UWB frequency bins comprising an existing interference noise temperature level by
determining a plurality of successive signal levels associated with the at least one UWB frequency bin,
determining an interference noise floor based upon the successively determined signal levels, and
determining the interference noise temperature level based up on the interference noise floor, and
setting a desired transmission level for use with the at least one UWB frequency bin based upon the existing interference level to keep a predicted overall interference level of the at least one (UWB frequency bin below an interference ceiling comprising an interference noise temperature ceiling.

28. The method of claim 27 wherein determining the interference noise floor comprises:
generating a histogram based upon the successively determined signal levels; and
determining the interference noise floor based upon the histogram.

29. The method of claim 27 wherein determining the successive signal levels comprises determining the successive signal levels using a fast Fourier transform (FFT) module.

30. The method of claim 27 wherein determining the successive signal levels comprises determining the successive signal levels using a discrete Fourier transform (DFT) module.

31. The method of claim 27 wherein the UWB frequency bins comprise orthogonal frequency division multiplexing (OFDM) frequency bins.

* * * * *

UNITED STATES PATENT AND TRADEMARK OFFICE
CERTIFICATE OF CORRECTION

PATENT NO. : 7,263,333 B2  
APPLICATION NO. : 10/963392  
DATED : August 28, 2007  
INVENTOR(S) : Roberts Page 1 of 1

It is certified that error appears in the above-identified patent and that said Letters Patent is hereby corrected as shown below:

Cover Page (56), 5th prior art reference  
Delete: "Santhoff"  
Insert: -- Santoff --

Column 8, Line 7  
Delete: "associate"  
Insert: -- associated --

Column 9, Lines 60 and 61  
Delete: "OWE"  
Insert: -- UWB --

Column 9, Line 66  
Delete: "OWE"  
Insert: -- UWB --

Column 10, Line 11  
Delete: "u on"  
Insert: -- upon --

Column 10, Line 18  
Delete: "claim wherein"  
Insert: -- claim 10 wherein --

Column 12, Line 14  
Delete: "up on"  
Insert: -- upon --

Column 12, Line 18  
Delete: "(UWB"  
Insert: -- UWB --

Signed and Sealed this

Twenty-ninth Day of April, 2008

JON W. DUDAS  
*Director of the United States Patent and Trademark Office*